United States Patent
Hallivuori et al.

(10) Patent No.: US 9,871,695 B2
(45) Date of Patent: Jan. 16, 2018

(54) NETWORK ELEMENT AND A CONTROLLER FOR MANAGING THE NETWORK ELEMENT

(71) Applicant: CORIANT OY, Espoo (FI)

(72) Inventors: Ville Hallivuori, Espoo (FI); Juhamatti Kuusisaari, Helsinki (FI)

(73) Assignee: CORIANT OY, Espoo (FI)

( * ) Notice: Subject to any disclaimer, the term of this patent is extended or adjusted under 35 U.S.C. 154(b) by 299 days.

(21) Appl. No.: 14/785,913

(22) PCT Filed: May 18, 2015

(86) PCT No.: PCT/FI2015/050340
§ 371 (c)(1),
(2) Date: Oct. 21, 2015

(87) PCT Pub. No.: WO2015/177405
PCT Pub. Date: Nov. 26, 2015

(65) Prior Publication Data
US 2016/0182280 A1 Jun. 23, 2016

(30) Foreign Application Priority Data

May 22, 2014 (FI) .................................... 20145463

(51) Int. Cl.
*G06F 15/177* (2006.01)
*H04L 12/24* (2006.01)

(52) U.S. Cl.
CPC ...... H04L 41/0803 (2013.01); H04L 41/0873 (2013.01)

(58) Field of Classification Search
CPC .................. H04L 41/0803; H04L 41/0873
See application file for complete search history.

(56) References Cited

U.S. PATENT DOCUMENTS 9,742,657 B2 * 8/2017 Narayanan ............ H04L 45/021
9,749,225 B2 * 8/2017 Li ............................ H04L 45/38
(Continued)

FOREIGN PATENT DOCUMENTS

CN 103067245 A 4/2013

OTHER PUBLICATIONS

Pat Bosshart et al: "P4: Programming Protocol-Independent Packet Processors",May 15, 2014 (May 15, 2014). XP055207217, Retrieved from the Internet:URL:http://arxiv.org/pdf/1312.1719.pdf [retrieved on Aug. 11, 2015], abstract; figures 1-3, Section 2, Section 4.

(Continued)

*Primary Examiner* — Mohamed Wasel
(74) *Attorney, Agent, or Firm* — Young & Thompson

(57) ABSTRACT

A network element of a software-defined network includes a data transfer interface (211) for receiving and transmitting data and a processing system (212) for constructing, in accordance with configuration data received from a controller system of the software-defined network, a configuration system for managing data to be forwarded. The processing system is adapted to configure a first portion of the configuration system to associate, with data received at the network element, a configuring entity-specific identifier (CEID) that identifies a configuring entity, for example an application, related to the received data. The configuring entity-specific identifier constitutes at least a part of metadata associated with the received data. Appropriate other portions of the configuration system are configured to use this metadata when determining actions to be carried out in conjunction with the received data. The configuring entity-specific identifier prevents conflicts between different configuring entities, for example applications, in the configuration system.

24 Claims, 4 Drawing Sheets

(56) References Cited

U.S. PATENT DOCUMENTS

| | | |
|---|---|---|
| 2013/0163427 A1 | 6/2013 | Beliveau et al. |
| 2014/0010083 A1 | 1/2014 | Hamdi et al. |
| 2014/0052836 A1 | 2/2014 | Nguyen et al. |
| 2014/0280893 A1* | 9/2014 | Pfeifer .................... H04L 43/04 709/224 |
| 2014/0330946 A1* | 11/2014 | Hallivuori ........... H04L 41/0823 709/220 |
| 2014/0341074 A1* | 11/2014 | Hallivuori ........... H04L 41/0853 370/254 |
| 2015/0043589 A1* | 2/2015 | Han ........................ H04L 45/38 370/392 |
| 2015/0263888 A1* | 9/2015 | Hallivuori ........... H04L 41/0803 709/226 |

OTHER PUBLICATIONS

Bozakov, B. et al. 'Towards a scalable software-defined network virtualization platform', 2014 IEEE Network Operations and Management Symposium (NOMS), May 5, 2014, pp. 1-8, doi:10.1109/NOMS.2014.6838411 section III.A.

ONF, Open Networking Foundation: 'OpenFlow Switch Specification', Version 1.3.3 (Protocol version 0x04), Sep. 27, 2013, [retrieved on Feb. 10, 2014]. Retrieved from the Internet: <URL: https://www.opennetworking.org/images/stories/downloads/sdn-resources/onf-specifications/openflow-spec-v1.3.3.pdf>, 164 pages chapter 5.

Finnish Search Report, dated Dec. 10, 2014, from corresponding Finnish Application.

International Search Report, dated Aug. 19, 2015, from corresponding PCT Application.

\* cited by examiner

NETWORK ELEMENT AND A CONTROLLER FOR MANAGING THE NETWORK ELEMENT

FIELD OF THE INVENTION

The invention relates generally to software-defined networking. More particularly, the invention relates to a network element for a software-defined network "SDN" and to a controller for a software-defined network. Furthermore, the invention relates to a method for configuring a network element of a software defined network, to a computer program for a network element of a software-defined network, and to a computer program for a controller of a software-defined network.

BACKGROUND

Software-defined networking is an emerging architecture for data transfer networks. In a software-defined network "SDN", the control plane is separated from the data plane so that the control plane is implemented in one or more controllers that can be separate from the network elements and the data plane is implemented in the network elements. The network elements can be, for example, Internet Protocol "IP" routers, multiprotocol label switching "MPLS" nodes, packet optical switches, and/or Ethernet switches. Each network element may consist of a single apparatus or a combination of a plurality of apparatuses. Typically, the software-defined networking allows for quick experimenting and optimization of switching and/or routing policies and external access to the innards of network elements that formerly were closed and proprietary.

Internet Protocol "IP" based networks were initially built based on the concept of Autonomous Systems "AS". This concept allows networks to scale and extend by connected junctions that forward packets to a reasonable next hop based on partial need-to-know information. The AS principle works much like the traditional post office service, where a postal worker in a given city does not need to know all the tenants of all the streets in another city in order to choose a reasonable next hop for a letter at hand. This approach to networking is simple, and has proven resilient and scalable. This approach has, however, a few drawbacks. It does not allow the designated destinations, or tenants with home mail-boxes, to move without changing their identity as far as the packet delivery service is concerned. The topological location of destinations, which is the network interface they are attached to, dictates their identity related to the packet delivery service, hi addition, using only the basic AS principle, it is hard to specify other qualities, such as logical grouping, access control, quality of service, intermediate network processing, or to specify aspects that relate to a sequence of packets that form a flow.

In the following, the software-defined networking is illustrated in a simplified manner using the analogy to the postal service. For any given street location, the software-defined networking works so that all the letters from all the tenants would first be aggregated by a network element on an edge a software-defined network. This network element is configured to examine the current location for each of the letter-destinations using a global lookup mechanism. Based on that global lookup and on other globally defined and globally measured considerations, such as access control or remote location load conditions, the said network element places one or more of the original letters in an additional envelope addressed to each of the street locations where the destinations currently are. It then uses the normal postal service which works like the traditional Internet Protocol "IP" to get these outer envelopes to the remote locations. This is done based on the existing and scalable hop-by-hop forwarding services. The outer envelopes are then opened by a remote network element and the original letters are delivered to the destinations. It is to be noted that the above-presented analogy between the software-defined networking and the postal service is a strong simplification and it gives only a limited viewpoint about the versatile possibilities provided by the software-defined networking.

The software defined networking is, however, not free from challenges. Some of the challenges are related to configuring the network elements. Traditionally, the network elements are configured so that the controller sends to each network element configuration data with the aid of which the network element constructs a configuration system. The configuration system enables the network element to operate as a part of the software-defined network. Thus, the controller actually programs the network element to operate in a desired way as the part of the software-defined network. The configuration system may comprise for example one or more look-up tables defining actions to be carried out in different operational situations. One of the challenges is related to a need to program many applications to a network element and/or to situations where two or more controllers are arranged to program a same network element. The applications can be such as e.g. the Voice over Internet "VoIP", the Video on Demand "VoD", Online gaming, Cacheing for content delivery and/or picture caching, etc. The applications are typically mutually uncoordinated, but in spite of this the applications have to be programmed so that they do not conflict each other in the configuration system. A look-up table of the configuration system may determine for example shapers which are to be used with one or more of the applications and which define the maximum allowable data rates and possibly also the maximum allowable burst-sizes for one or more of the applications. Concerning e.g. the VoIP, the maximum allowable data rate per a micro flow can be e.g. 64 kbits/s, whereas for the VoD the maximum allowable data rate per a micro flow can be e.g. 4 Mbits/s. As obvious, the VoD does not work properly if there is a conflict between these applications in the configuration system so that the shaper of VoIP is in some cases erroneously used for shaping data traffic representing the VoD. Furthermore, similar conflicts may arise when two or more controllers are arranged to program a same network element. Therefore, when programming different applications to a network element and also when two or more controllers are programming a same network element, there is a need for mechanisms which prohibit conflicts of the kind mentioned above.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the invention, there is provided a new network element for a software-defined network "SDN", i.e. for a data transfer network where the software-defined networking is applied. The network element can be, for example, an Internet Protocol "IP" router, a multiprotocol label switching "MPLS" switch, a packet optical switch, and/or an Ethernet switch.

A network element according to the invention comprises a data transfer interface for transmitting data to the software-defined network and for receiving data from the software-defined network, and a processing system adapted to:

construct, in accordance with configuration data received from a controller system of the software-defined network, a configuration system for managing data to be forwarded so as to enable the network element to operate as a part of the software defined network, configure a first portion of the configuration system to associate, with data received at the network element, a configuring entity-specific identifier that identifies a configuring entity related to the received data, the configuring entity-specific identifier constituting at least a part of metadata associated with the received data, and configure second portions of the configuration system, which are used subsequently to the first portion of the configuration system, to use the metadata comprising the configuring entity-specific identifier when determining actions to be carried out in conjunction with the received data.

The above-mentioned configuring entity can be for example an application such as e.g. the Voice over Internet "VoIP", the Video on Demand "VoD", Online gaming for providing game services, or Cacheing for content delivery and/or picture caching. It is also possible that the above-mentioned configuring entity is a controller belonging to controller system of the software-defined network and adapted to program the network element under consideration.

The above-mentioned configuring entity-specific identifier makes parts of the configuration system which are related to different configuring entities uniquely addressable. Therefore, it is possible to avoid conflicts where a wrong part of the configuration system is erroneously used in a situation where metadata items defined by mutually uncoordinated applications and/or controllers are the same by a coincidence.

In accordance with the invention, there is provided also a new controller for configuring network elements of a software-defined network "SDN". The controller can be a part of a controller system constituted by many controllers of the software-defined network. It is also possible that the controller alone constitutes the controller system of the software-defined network. Furthermore, the controller can be a single apparatus or a combination of a plurality of apparatuses capable of communicating with each other. A controller according to the invention comprises:

a processing system adapted to compose configuration data for controlling a network element to construct a configuration system for managing data to be forwarded by the network element so as to enable the network element to operate as a part of the software defined network, and a data transfer interface adapted to transmit the configuration data to the network element.

The processing system of the controller is adapted to compose the configuration data to comprise configuration data portions for controlling the network element to:

configure a first portion of the configuration system to associate, with data received at the network element, a configuring entity-specific identifier identifying a configuring entity related to the data received at the network element, the configuring entity-specific identifier constituting at least a part of metadata associated with the data received at the network element, and configure second portions of the configuration system, which are used subsequently to the first portion of the configuration system, to use the metadata comprising the configuring entity-specific identifier when determining actions to be carried out by the network element in conjunction with the data received at the network element.

In accordance with the invention, there is provided also a new method for configuring a network element of a software-defined network "SDN". A method according to the invention comprises:

constructing, in accordance with configuration data received from a controller system of the software-defined network, a configuration system of the network element for managing data to be forwarded so as to enable the network element to operate as a part of the software defined network, configuring a first portion of the configuration system to associate, with data received at the network element, a configuring entity-specific identifier identifying a configuring entity related to the received data, the configuring entity-specific identifier constituting at least a part of metadata associated with the received data, and configuring second portions of the configuration system, which are used subsequently to the first portion of the configuration system, to use the metadata comprising the configuring entity-specific identifier when determining actions to be carried out by the network element in conjunction with the received data.

In accordance with the invention, there is provided also a new method for providing configuration data for configuring a network element of a software-defined network "SDN". A method according to the invention comprises composing the configuration data to comprise configuration data portions for controlling the network element to:

construct a configuration system for managing data to be forwarded by the network element so as to enable the network element to operate as a part of the software defined network, configure a first portion of the configuration system to associate, with data received at the network element, a configuring entity-specific identifier identifying a configuring entity related to the data received at the network element, the configuring entity-specific identifier constituting at least a part of metadata associated with the data received at the network element, and configure second portions of the configuration system, which are used subsequently to the first portion of the configuration system, to use the metadata comprising the configuring entity-specific identifier when determining actions to be carried out by the network element in conjunction with data received at the network element.

In accordance with the invention, there is provided also a new computer program for a network element of a software-defined network. A computer program according to the invention for the network element comprises computer executable instructions for controlling a programmable processing system of the network element to:

construct, in accordance with configuration data received from a controller system of the software-defined network, a configuration system for managing data to be forwarded so as to enable the network element to operate as a part of the software defined network, configure a first portion of the configuration system to associate, with data received at the network element, a configuring entity-specific identifier identifying a configuring entity related to the received data, the configuring entity-specific identifier constituting at least a part of metadata associated with the received data, and configure second portions of the configuration system, which are used subsequently to the first portion of the configuration system, to use the metadata comprising the configuring entity-specific identifier when determining actions to be carried out by the network element in conjunction with the received data.

In accordance with the invention, there is provided also a new computer program for a controller of a software-defined network. A computer program according to the invention for the controller comprises computer executable instructions for controlling a programmable processing system of the controller to compose configuration data for controlling a network element to:

construct a configuration system for managing data to be forwarded by the network element so as to enable the network element to operate as a part of the software defined network, configure a first portion of the configuration system to associate, with data received at the network element, a configuring entity-specific identifier identifying a configuring entity related to the data received at the network element, the configuring entity-specific identifier constituting at least a part of metadata associated with the data received at the network element, and configure second portions of the configuration system, which are used subsequently to the first portion of the configuration system, to use the metadata comprising the configuring entity-specific identifier when determining actions to be carried out by the network element in conjunction with data received at the network element.

The computer program for the controller further comprises computer executable instructions for controlling the programmable processing system of the controller to control a data transfer interface of the controller to transmit the configuration data to the network element.

In accordance with the invention, there is provided also a new computer program product. The computer program product comprises a non-volatile computer readable medium, e.g. a compact disc "CD", encoded with a computer program according to the invention for the network element and/or with a computer program according to the invention for the controller.

A number of exemplifying and non-limiting embodiments of the invention are described in accompanied dependent claims.

Various exemplifying and non-limiting embodiments of the invention both as to constructions and to methods of operation, together with additional objects and advantages thereof, will be best understood from the following description of specific exemplifying embodiments when read in connection with the accompanying drawings.

The verbs "to comprise" and "to include" are used in this document as open limitations that neither exclude nor require the existence of also un-recited features. The features recited in the accompanied dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF THE FIGURES

Exemplifying and non-limiting embodiments of the invention and their advantages are explained in greater detail below with reference to the accompanying drawings, in which.

DESCRIPTION OF EXEMPLIFYING EMBODIMENTS

Figure 1:
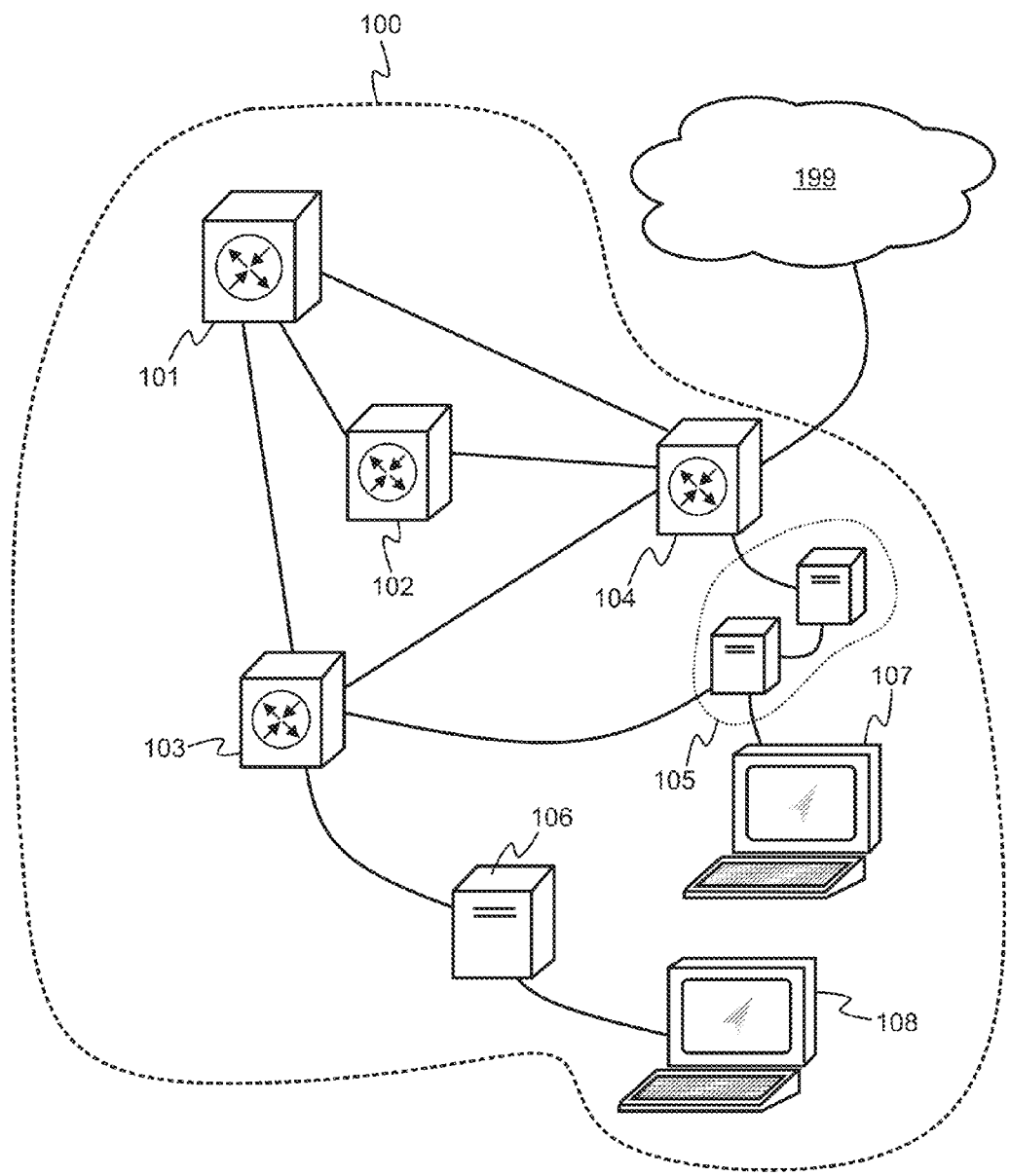
FIG. 1 shows a schematic illustration of a software-defined network comprising network elements according to an exemplifying and non-limiting embodiment of the invention and controllers according to an exemplifying and non-limiting embodiment of the invention.

FIG. 1 shows a schematic illustration of an exemplifying software-defined network "SDN" 100. The software-defined network comprises network elements 101, 102, 103, and 104. The software-defined network 100 further comprises controllers 105 and 106 that can be deemed to constitute a controller system of the software-defined network. The network elements 101-104 of this exemplifying software-defined network are mutually interconnected with data transfer links as illustrated in FIG. 1. Furthermore, the exemplifying software-defined network 100 may comprise other network elements that are not shown in FIG. 1. Each of the network elements may be e.g. an Internet Protocol "IP" router, a multiprotocol label switching "MPLS" node, a packet optical switch, and/or an Ethernet switch. Each network element may consist of a single apparatus or a combination of a plurality of apparatuses. As well, each of the controllers 105 and 106 may consist of a single apparatus or a combination of a plurality of apparatuses. In the exemplifying case illustrated in FIG. 1, the controller 105 comprises two interconnected apparatuses. A user-interface device 107 is connected to the controller 105, and correspondingly a user-interface device 108 is connected to the controller 106. In the exemplifying case illustrated in FIG. 1, the network element 104 acts as a gateway to an external network 199 that can be e.g. the global Internet. It is to be noted that the controller 105 or one or more parts of it can also act as a network element that can be e.g. an Internet Protocol "IP" router, a multiprotocol label switching "MPLS" switch, a packet optical switch, and/or an Ethernet switch. Correspondingly, the controller 106 or one or more parts of it can also act as a network element of the kind mentioned above.

Without limiting the generality and merely for illustrative purposes, we consider the operation of the controller 105. The controller 106 may operate in the similar way. The controller 105 is adapted to send, to at least one of the network elements 101-104, configuration data for controlling the network element under consideration to construct a configuration system that enables the network element to manage data in a desired manner. The configuration system may comprise for example a system of interconnected look-up tables for selecting software-defined actions to be carried out in different operational situations. The data to be managed can be in a form of data frames such as for example Internet Protocol IP-packets, MPLS-labeled frames, Ethernet frames, or the data can be in some other form accordant with one or more data transfer protocols being used. The controller 105 can be adapted to configure the network element under consideration in accordance with for example the OpenFlow protocol or some other protocol suitable for the software-defined networking. More details about the OpenFlow can be found from the OpenFlow Switch Specification managed by the Open Networking Foundation "ONF".

In an exemplifying case where the OpenFlow is used, the configuration system comprises one or more flow tables and one or more group tables according to the OpenFlow specification. Each flow table contains a set of flow entries. Each flow entry may consist of match fields, counters, and a set of software-defined actions to apply to matching data frames. Matching typically starts at the first flow table and may continue to additional flow tables. Flow entries are typically arranged into a priority order and the first matching entry in each table is the one being used. If a matching flow entry is found, the one or more software-defined actions associated with this specific flow entry are executed. If no match is found in a flow table, the data frame under consideration may be forwarded to the controller 105 over an OpenFlow channel between the network element under consideration and the controller 105, the data frame may be dropped, or the data frame may continue to the next flow table or to a group table. Software-defined actions associated with each flow entry may comprise for example data frame forwarding, data frame modification, group table processing, and pipeline processing. Pipeline processing actions allow data frames to be sent to subsequent flow tables for further processing and allow information, in the form of metadata, to be communicated between the flow tables. In conjunction with the OpenFlow, the metadata is typically a bit vector having 64 bits. The pipeline processing stops when the one or more software-defined actions associated with a matching flow entry does not specify a next table. At this point the data frame under consideration is usually modified and forwarded. The group table processing actions allow data frames to be sent to a group table for further processing and allow information, in the form of metadata, to be communicated to the group table. The group table contains group entries, where each group entry may contain a list of software-defined actions to be executed in conjunction with data frames defined to belong to a particular group. Furthermore, the configuration data that is sent the network element under consideration may comprise one or more configuration programs each of which comprising one or more computer executable instructions defining a software-defined action or a chain of software-defined actions to be executed in conjunction with managing data in the network element under consideration. The software-defined action or the chain of software-defined actions defined by the configuration program may comprise for example: recording data into a memory, modifying the data, selecting one or more of egress ports of the network element and forwarding the data and its possible duplicates to the selected one or more egress ports, selecting one or more look-up tables of the configuration system of the network element and executing one or more look-ups from the selected look-up tables, performing arithmetic operations, branching operations, performing logical operations, reading metadata associated with the data being managed, writing metadata associated with the data, modifying metadata associated with the data, dropping the data, and/or duplicating the data.

In many cases, the network elements 101-104 or at least some of them need to be programmed to support many different applications such as for example the Voice over Internet "VoIP", the Video on Demand "VoD", Online gaming for providing game services, Cacheing for content delivery and/or picture caching, etc. Without limiting the generality and merely for illustrative purposes, we can assume that the network element 101 is one of the above-mentioned network elements which need to be programmed to support many different applications of the kind mentioned above. The network element 101 comprises a data transfer interface for receiving and transmitting data. The network element 101 comprises means for constructing the configuration system in accordance with the configuration data received from the controller 105 and/or from the controller 106. Data being managed by the configuration system is typically associated with metadata that allows information to be communicated between different parts of the configuration system. The network element 101 can be programmed to support all the applications by one of the controllers 105 and 106, or the network element can be programmed to support some of the applications by the controller 105 and some others of the applications by the controller 106. Individual applications and/or groups of applications and/or the controllers constitute controlling entities each of which has its controlling entity-specific parts in the configuration system of the network element 101. Each of the above-mentioned groups of applications is assumed to contain such applications which are programmed to the network element 101 in a coordinated way so that the applications belonging to the group under consideration can be treated as a single configuring entity. In exemplifying cases where the configuration system comprises a look-up table system for determining actions to be carried out, the controlling entity-specific parts of the configuration system may comprise for example given entries of the look-up tables of the look-up table system.

In an exemplifying case, the network element 101 comprises means for configuring a first portion of the configuration system to associate, with data received at the network element, a configuring entity-specific identifier that identifies a configuring entity related to the received data. The configuring entity can be for example an application or a group of applications related to the received data. The configuring entity-specific identifier constitutes at least a part of the metadata associated with the received data and used by the configuration system for communicating information between different parts of the configuration system. The first portion of the configuration system can be for example a portion which recognizes an ingress port "IPORT" of the received data, a portion which recognizes a virtual local access network "VLAN" or some other corresponding entity related to the received data, or a portion which determines policing operations to be directed to the received data. The network element 101 comprises means for configuring second portions of the configuration system, which are used subsequently to the first portion of the configuration system, to use the metadata comprising the configuring entity-specific identifier when determining actions to be carried out in conjunction with the received data. The configuring entity-specific identifier makes parts of the configuration system, which are related to different configuring entities, uniquely addressable. Therefore, it is possible to avoid conflicts where a wrong part of the configuration system is erroneously used for example so that a wrong entry of a look-up table is erroneously selected in a situation where metadata items defined by mutually uncoordinated applications and/or controllers are the same by a coincidence. Thus, in this exemplifying case, the network element 101 is adapted to make the parts of the configuration system related to different applications or groups of applications uniquely addressable.

In another exemplifying case, the network element 101 is configured by both of the controllers 105 and 106. Each of the controllers comprises means for composing configuration data for controlling the network element 101 to construct parts of the configuration system related to one or more applications programmed by the controller under consideration. Each of the controllers is adapted to compose configuration data portions for controlling the network element 101 to configure a first portion of the configuration system of the network element to associate, with data received at the network element, a configuring entity-specific identifier identifying a configuring entity related to the data received at the network element. The configuring entity-specific identifier constitutes at least a part of the metadata associated with the received data and used by the configuration system for communicating information between different parts of the configuration system. Therefore, in this exemplifying case, each of the controllers 105 and 106 is adapted to compose the corresponding configuration data so that the network element 101 is programmed by the configuration data to construct the configuration system of the network element so that parts of the configuration system, which are related to applications or groups of applications programmed by these controllers, are uniquely addressable so as to avoid conflicts between these parts of the configuration system.

Figure 2:
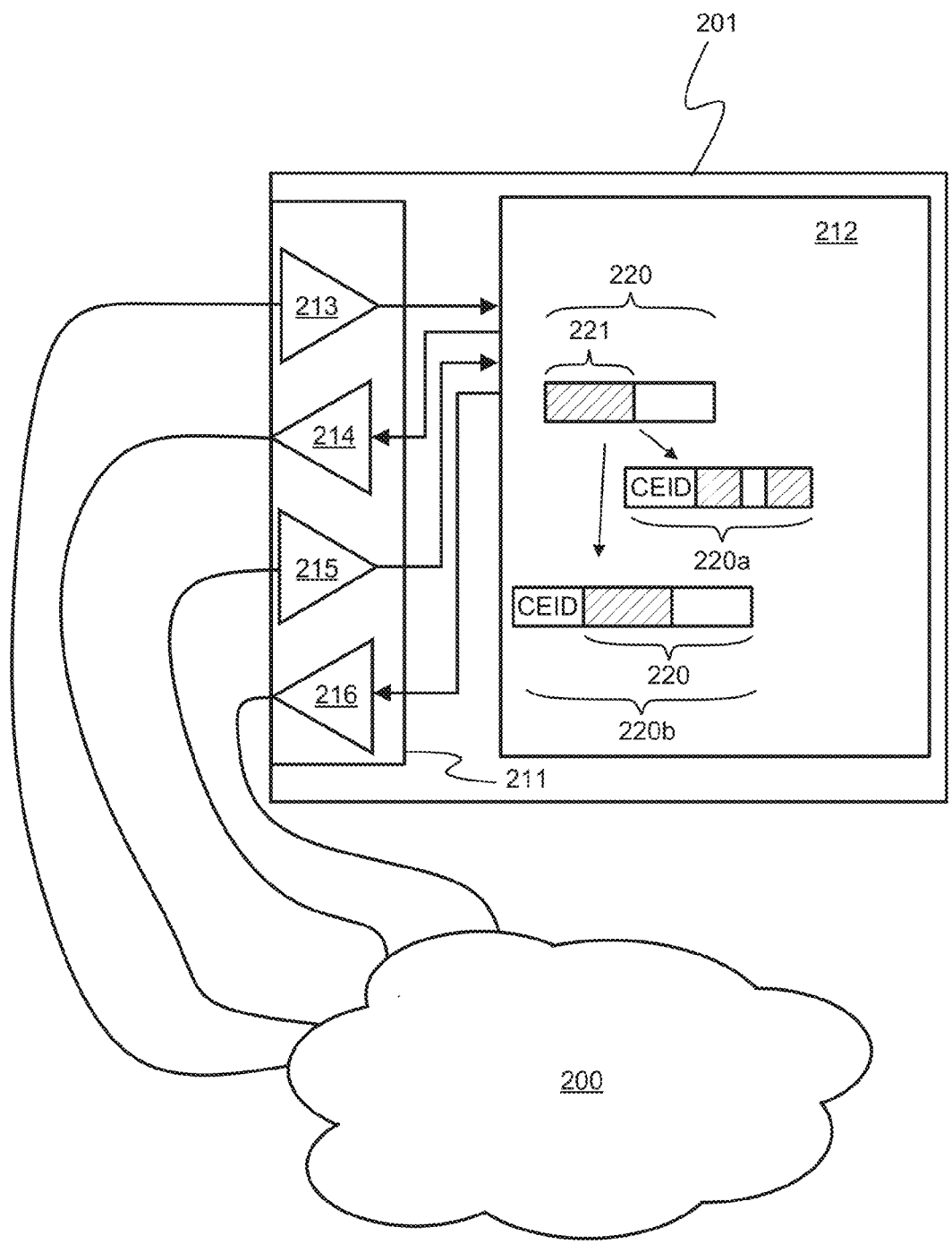
FIG. 2 shows a schematic illustration of a network element according to an exemplifying and non-limiting embodiment of the invention.

FIG. 2a shows a schematic illustration of a network element 201 according to an exemplifying and non-limiting embodiment of the invention. The network element can be, for example, an Internet Protocol "IP" router, a Multiprotocol label switching "MPLS" switch, a packet optical switch, and/or an Ethernet switch. In the exemplifying case illustrated in FIG. 2, the network element 201 is a single apparatus but the network element could as well be a combination of a plurality of apparatuses. The network element comprises a data transfer interface 211 for receiving data and for transmitting data. The data transfer interface 211 comprises ingress ports 213 and 215 and egress ports 214 and 216 for connecting to data transfer links of a software-defined network "SDN". In FIG. 2, the elements of the software-defined network other than the network element 201 are depicted with a cloud 200. The network element 201 comprises a processing system 212 adapted to construct a configuration system in accordance with configuration data received from a controller system of the software-defined network so as to enable the network element to operate as a part of the software defined network. The configuration system may comprise for example look-up tables for selecting software-defined actions when managing data to be forwarded.

The processing system 212 is adapted to configure a first portion of the configuration system to associate, with data received at the network element, a configuring entity-specific identifier CEID identifying a configuring entity related to the received data. The configuring entity-specific identifier CEID can be adapted to identify an application or a group of applications represented by the received data. The applications may comprise for example the Voice over Internet "VoIP", the Video on Demand "VoD", Online gaming for providing game services, and/or Cacheing for content delivery and/or picture caching. It is also possible that the configuring entity-specific identifier CEID is adapted to identify a particular one of controllers, or a particular group of mutually coordinating controllers, of the controller system of the software-defined network, where the particular one of the controllers or the particular group of controllers is the controller or the group of controllers which has sent configuration data on the basis of which an application or a group of applications related to the received data has been programmed to the configuration system of the network element 201. The configuring entity-specific identifier CEID constitutes at least a part of metadata associated with the received data. The processing system 212 is adapted to configure second portions of the configuration system, which are used subsequently to the first portion of the configuration system, to use the metadata comprising the configuring entity-specific identifier when determining actions to be carried out in conjunction with the received data.

In a network element according to an exemplifying and non-limiting embodiment of the invention, the processing system 212 is adapted to modify metadata formats each being defined by one of mutually different configuring entities so that the configuring entity-specific identifier is at a same location in each of the modified metadata formats. The metadata format defined by a configuring entity, e.g. an application or a group of applications, can be such as a block 220 where the hatched area 221 represents the proper metadata and the whole block 220 represents the data field allocated for the metadata. In this exemplifying case, the left-most portion of the metadata is transferred to the right-most part of the block 220 so as to make room for the configuring entity-specific identifier CEID as illustrated by a block 220a which represents an exemplifying modified metadata format.

In a network element according to another exemplifying and non-limiting embodiment of the invention, the processing system 212 is adapted to modify metadata formats each being defined by one of mutually different configuring entities to contain an additional data field for the configuring entity-specific identifier. This is illustrated with a block 220b which represents an exemplifying modified metadata format and which comprises the original metadata format represented by the block 220 and an additional data field for the configuring entity-specific identifier CEID.

In a network element according to an exemplifying and non-limiting embodiment of the invention, the processing system 212 is adapted to determine the configuring entity-specific identifier for the received data on the basis of at least one of the following:

the Open Systems Interconnection "OSI" model Level 1 physical layer "L1" field classification, e.g. an ingress port number, the OSI model Level 2 data link layer "L2" field classification, e.g. a virtual local access network "VLAN", the OSI model Level 3 network layer "L3" field classification, e.g. an Internet Protocol "IP" source address, an IP destination address, or an IP differentiated service code point "DSCP", the OSI model Level 4 transport layer "L4" field classification, e.g. a transmission control protocol "TCP" port number or a user datagram protocol "UDP" port number, the OSI model Level 5 session layer "L5" field classification, e.g. a real time transport protocol "RTTP" header or a point-to-point tunneling protocol "PPTP" header, the OSI model Level 6 presentation layer "L6" field classification, the OSI model Level 7 application layer "L7" field classification, e.g. a hypertext transfer protocol "HTTP" header and/or a session initiation protocol "SIP" header, a virtual private network "VPN", a class-of-service "CoS", a MultiProtocol label Switching "MPLS" header.

The processing system 212 of the network element 201 can be implemented with one or more processor circuits, each of which can be a programmable processor circuit provided with appropriate software, a dedicated hardware processor such as, for example, an application specific integrated circuit "ASIC", or a configurable hardware processor such as, for example, a field programmable gate array "FPGA".

Figure 3:
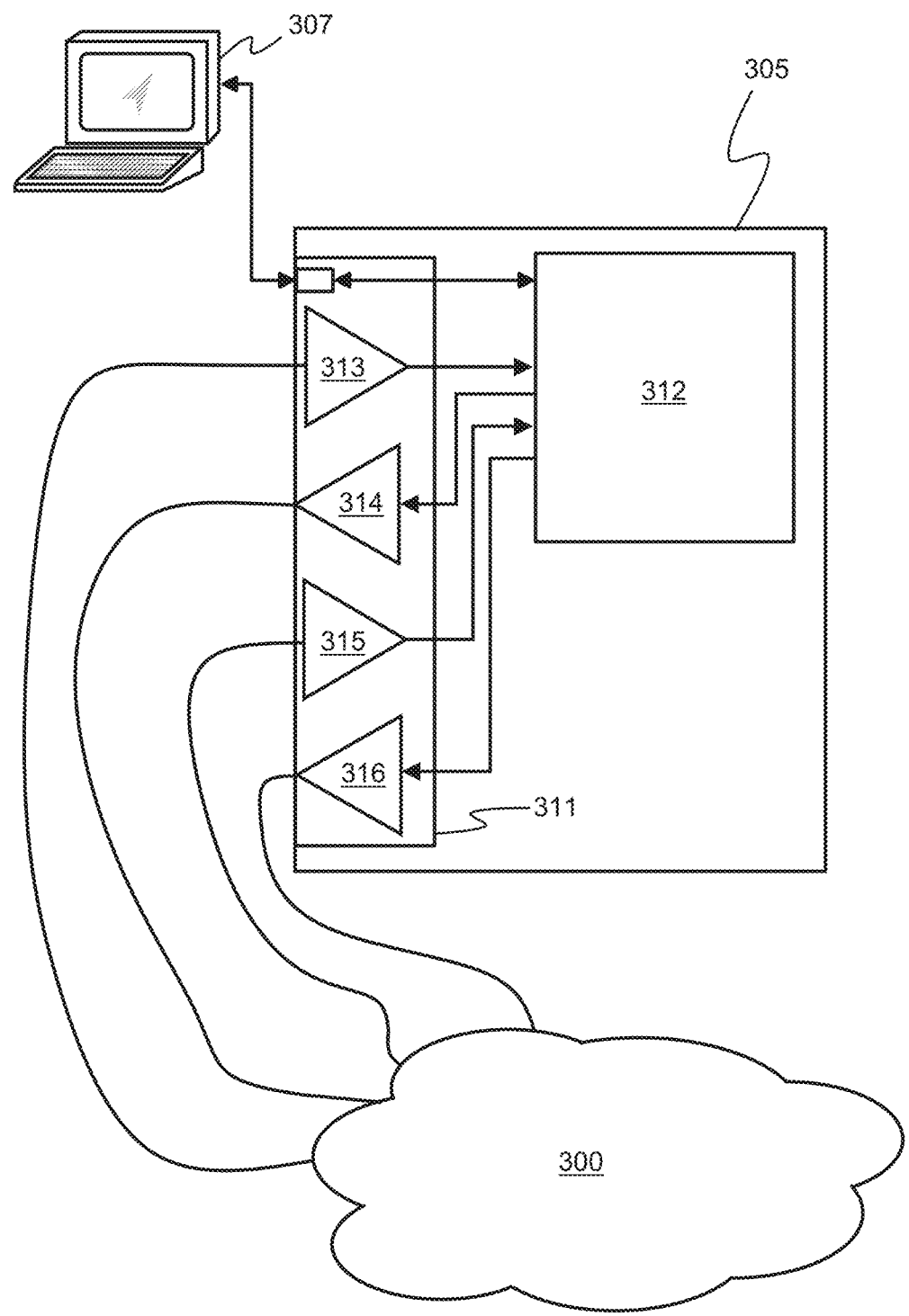
FIG. 3 shows a schematic illustration of a controller according to an exemplifying and non-limiting embodiment of the invention for configuring network elements of a software-defined network.

FIG. 3 shows a schematic illustration of a controller 305 according to an exemplifying and non-limiting embodiment of the invention for configuring network elements of a software-defined network. The network elements to be configured are not shown in FIG. 3. In the exemplifying case illustrated in FIG. 3, the controller 305 is a single apparatus but, as mentioned earlier in this document, the controller could as well be a combination of a plurality of apparatuses. The controller comprises a data transfer interface 311 for receiving data and for transmitting data. The data transfer interface 311 comprises ingress ports 313 and 315 and egress ports 314 and 316 for connecting via data transfer links to other elements of the software-defined network. In FIG. 3, the elements of the software-defined network other than the controller 305 are depicted with a cloud 300. The data transfer interface 311 may further comprise one or more data ports for connecting to a user interface device 307 and/or to other peripheral devices. The controller 305 comprises a processing system 312 for composing configuration data enabling each of the network elements to construct a configuration system so as to enable the network element under consideration to operate as a part of the software-defined network.

The processing system 312 is adapted to compose the configuration data to comprise configuration data portions for controlling the network element under consideration to configure a first portion of the configuration system of the network element to associate, with data received at the network element, a configuring entity-specific identifier which identifies a configuring entity related to the data received at the network element and which constitutes at least a part of metadata associated with the data received at the network element. The configuration data portions control the network element also to configure second portions of the configuration system, which are used subsequently to the first portion of the configuration system, to use the metadata comprising the configuring entity-specific identifier when determining actions to be carried out by the network element in conjunction with the data received at the network element. The configuring entity-specific identifier may identify an application or a group of applications represented by the data received at the network element. Furthermore, configuring entity-specific identifier may identify the controller 305 from among all controllers of the software-defined network and an application or a group of applications represented by the data received at the network element and programmed to the network element by the controller 305.

In a controller according to an exemplifying and non-limiting embodiment of the invention, the processing system 312 is adapted to modify metadata formats each being defined by one of mutually different configuring entities so that the configuring entity-specific identifier is at a same location in each of the modified metadata formats. Furthermore, the processing system 312 is adapted to compose the configuration data to comprise configuration data portions for controlling the network element to use the modified metadata formats.

In a controller according to another exemplifying and non-limiting embodiment of the invention, the processing system 312 is adapted to modify metadata formats each being defined by one of mutually different configuring entities to contain an additional data field for the configuring entity-specific identifier. Furthermore, the processing system 312 is adapted to compose the configuration data to comprise configuration data portions for controlling the network element to use the modified metadata formats.

The processing system 312 of the controller 305 can be implemented with one or more processor circuits, each of which can be a programmable processor circuit provided with appropriate software, a dedicated hardware processor such as, for example, an application specific integrated circuit "ASIC", or a configurable hardware processor such as, for example, a field programmable gate array "FPGA".

Figure 4:
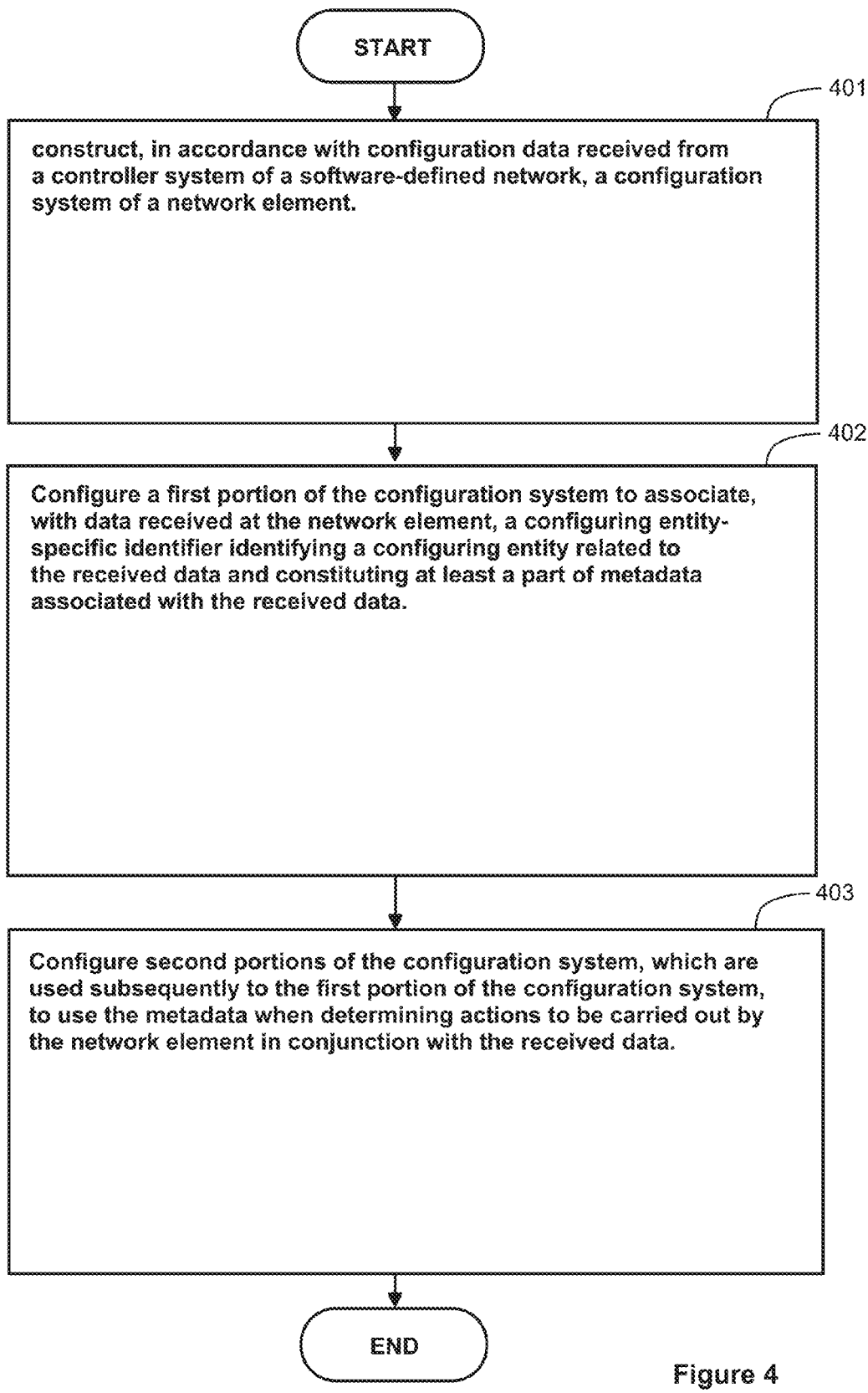
FIG. 4 shows a flow chart of a method according to an exemplifying and nonlimiting embodiment of the invention for configuring a network element of a software-defined network.

FIG. 4 shows a flow chart of a method according to an exemplifying and nonlimiting embodiment of the invention for configuring a network element of a software-defined network. The method comprises the following actions:

action 401: constructing, in accordance with configuration data received from a controller system of the software-defined network, a configuration system of the network element for managing data to be forwarded so as to enable the network element to operate as a part of the software defined network, action 402: configuring a first portion of the configuration system to associate, with data received at the network element, a configuring entity-specific identifier identifying a configuring entity related to the received data, the configuring entity-specific identifier constituting at least a part of metadata associated with the received data, and action 403: configuring second portions of the configuration system, which are used subsequently to the first portion of the configuration system, to use the metadata comprising the configuring entity-specific identifier when determining actions to be carried out by the network element in conjunction with the received data.

A method according to an exemplifying and non-limiting embodiment of the invention comprises modifying metadata formats each being defined by one of mutually different configuring entities so that the configuring entity-specific identifier is at a same location in each of the modified metadata formats.

A method according to another exemplifying and non-limiting embodiment of the invention comprises modifying metadata formats each being defined by one of mutually different configuring entities to contain an additional data field for the configuring entity-specific identifier.

In a method according to an exemplifying and non-limiting embodiment of the invention, the configuring entity-specific identifier identifies an application or a group of applications represented by the received data.

In a method according to an exemplifying and non-limiting embodiment of the invention, the configuring entity-specific identifier identifies one or more of controllers of the controller system, where the one or more of the controllers have sent a portion of the configuration data so that an application or a group of applications represented by the received data has been programmed to the configuration system on the basis of the portion of the configuration data.

In a method according to an exemplifying and non-limiting embodiment of the invention, each application is one of the following: Voice over Internet "VoIP", Video on Demand "VoD", Online gaming for providing game services, Cacheing for content delivery and/or picture caching.

In a method according to an exemplifying and non-limiting embodiment of the invention, the configuring entity-specific identifier is determined for the received data on the basis of at least one of the following:

the OSI model Level 1 physical layer "L1" field classification, e.g. an ingress port number,
the OSI model Level 2 data link layer "L2" field classification, e.g. a virtual local access network "VLAN",
the OSI model Level 3 network layer "L3" field classification, e.g. an Internet Protocol "IP" source address, an IP destination address, or an IP differentiated service code point "DSCP",
the OSI model Level 4 transport layer "L4" field classification, e.g. a transmission control protocol "TOP" port number or a user datagram protocol "UDP" port number,
the OSI model Level 5 session layer "L5" field classification, e.g. a real time transport protocol "RTTP" header or a point-to-point tunneling protocol "PPTP" header,
the OSI model Level 6 presentation layer "L6" field classification,
the OSI model Level 7 application layer "L7" field classification, e.g. a hypertext transfer protocol "HTTP" header and/or a session initiation protocol "SIP" header,
a virtual private network "VPN",
a class-of-service "CoS",
a MultiProtocol label Switching "MPLS" header.

A computer program according to an exemplifying and non-limiting embodiment of the invention comprises computer executable instructions for controlling a programmable processing system to carry out actions related to a method according to any of the above-described exemplifying embodiments of the invention.

A computer program according to an exemplifying and non-limiting embodiment of the invention comprises software modules for a network element of a software-defined network. The software modules comprise computer executable instructions for controlling a programmable processing system of the network element to:

construct, in accordance with configuration data received from a controller system of the software-defined network, a configuration system for managing data to be forwarded so as to enable the network element to operate as a part of the software defined network, configure a first portion of the configuration system to associate, with data received at the network element, a configuring entity-specific identifier identifying a configuring entity related to the received data, the configuring entity-specific identifier constituting at least a part of metadata associated with the received data, and configure second portions of the configuration system, which are used subsequently to the first portion of the configuration system, to use the metadata comprising the configuring entity-specific identifier when determining actions to be carried out by the network element in conjunction with the received data.

A computer program according to an exemplifying and non-limiting embodiment of the invention comprises software modules for a controller of a software-defined network. The software modules comprise computer executable instructions for controlling a programmable processing system of the controller to:

compose configuration data for controlling a network element to construct a configuration system for managing data to be forwarded by the network element so as to enable the network element to operate as a part of the software defined network, and control a data transfer interface of the controller to transmit the configuration data to the network element.

The software modules of the computer program for the controller further comprise computer executable instructions for controlling the programmable processing system of the controller to compose the configuration data for controlling the network element to:

configure a first portion of the configuration system to associate, with data received at the network element, a configuring entity-specific identifier identifying a configuring entity related to the data received at the network element, the configuring entity-specific identifier constituting at least a part of metadata associated with the data received at the network element, configure second portions of the configuration system, which are used subsequently to the first portion of the configuration system, to use the metadata comprising the configuring entity-specific identifier when determining actions to be carried out by the network element in conjunction with data received at the network element.

The software modules can be e.g. subroutines or functions implemented with a suitable programming language and with a compiler suitable for the programming language and a programmable processing system under consideration. It is worth noting that also a source code corresponding to a suitable programming language represents the computer executable software modules because the source code contains the information needed for controlling a programmable processing system to carry out the above-presented actions and compiling changes only the format of the information. Furthermore, it is also possible that the programmable processing system for running a computer program according to an exemplifying embodiment of the invention is provided with an interpreter so that a source code implemented with a suitable programming language does not need to be compiled prior to running.

A computer program product according to an exemplifying and non-limiting embodiment of the invention comprises a computer readable medium, e.g. a compact disc "CD", encoded with a computer program according to an exemplifying embodiment of invention for a network element and/or with a computer program according to an exemplifying embodiment of invention for a controller.

A signal according to an exemplifying and non-limiting embodiment of the invention is encoded to carry information defining a computer program according to an exemplifying embodiment of invention.

The specific examples provided in the description given above should not be construed as limiting the scope and/or the applicability of the appended claims.

What is claimed is:

1. A network element for a software-defined network, the network element comprising a data transfer interface for transmitting data to the software-defined network and for receiving data from the software-defined network, and a processing system adapted to:
   construct, in accordance with configuration data received from a controller system of the software-defined network, a configuration system for managing data to be forwarded so as to enable the network element to operate as a part of the software defined network,
   configure a first portion of the configuration system to associate, with data received at the network element, a configuring entity-specific identifier identifying a configuring entity related to the received data, the configuring entity-specific identifier constituting at least a part of metadata associated with the received data, and
   configure second portions of the configuration system, which are used subsequently to the first portion of the configuration system, to use the metadata comprising the configuring entity-specific identifier when determining actions to be carried out in conjunction with the received data.

2. The network element according to claim 1, wherein the processing system is adapted to modify metadata formats each being defined by one of mutually different configuring entities so that the configuring entity-specific identifier is at a same location in each of the modified metadata formats.

3. The network element according to claim 1, wherein the processing system is adapted to modify metadata formats each being defined by one of mutually different configuring entities to contain an additional data field for the configuring entity-specific identifier.

4. The network element according to claim 1, wherein the configuring entity-specific identifier is adapted to identify an application or a group of applications represented by the received data.

5. The network element according to claim 1, wherein the configuring entity-specific identifier is adapted to identify one or more of controllers of the controller system, the one or more of the controllers having sent a portion of the configuration data so that an application or a group of applications represented by the received data has been programmed to the configuration system on the basis of the portion of the configuration data.

6. The network element according to claim 4, wherein each application is one of the following: Voice over Internet "VoIP", Video on Demand "VoD", Online gaming for providing game services, Cacheing for content delivery and picture caching.

7. The network element according to claim 1, wherein the processing system is adapted to determine the configuring entity-specific identifier for the received data on the basis of at least one of the following:
   the OSI model Level 4 transport layer field classification related to the received data,
   the OSI model Level 5 session layer field classification related to the received data,
   the OSI model Level 6 presentation layer field classification related to the received data,
   the OSI model Level 7 application layer "L7" field classification related to the received data.

8. The network element according to claim 1, wherein the network element is at least one of the following: an Internet Protocol IP router, a MultiProtocol Label Switching MPLS switch, a packet optical switch, an Ethernet switch.

9. A controller for configuring a network element of a software-defined network, the controller comprising:
   a processing system adapted to compose configuration data for controlling the network element to construct a configuration system for managing data to be forwarded by the network element so as to enable the network element to operate as a part of the software defined network, and
   a data transfer interface adapted to transmit the configuration data to the network element,
   wherein the processing system is adapted to compose the configuration data to comprise configuration data portions for controlling the network element to:
   configure a first portion of the configuration system to associate, with data received at the network element, a configuring entity-specific identifier identifying a configuring entity related to the data received at the network element, the configuring entity-specific identifier constituting at least a part of metadata associated with the data received at the network element, and
   configure second portions of the configuration system, which are used subsequently to the first portion of the configuration system, to use the metadata comprising the configuring entity-specific identifier when determining actions to be carried out by the network element in conjunction with the data received at the network element.

10. The controller according to claim 9, wherein the processing system is adapted to modify metadata formats each being defined by one of mutually different configuring entities so that the configuring entity-specific identifier is at a same location in each of the modified metadata formats and to compose the configuration data to comprise configuration data portions for controlling the network element to use the modified metadata formats.

11. The controller according to claim 9, wherein the processing system is adapted to modify metadata formats each being defined by one of mutually different configuring entities to contain an additional data field for the configuring entity-specific identifier and to compose the configuration data to comprise configuration data portions for controlling the network element to use the modified metadata formats.

12. The controller according to claim 9, wherein the configuring entity-specific identifier is adapted to identify an application or a group of applications represented by the data received at the network element.

13. The controller according to claim 9, wherein the configuring entity-specific identifier is adapted to identify the controller from among all controllers of the software-defined network and an application or a group of applications represented by the data received at the network element.

14. A method for configuring a network element of a software-defined network, the method comprising:
   constructing, in accordance with configuration data received from a controller system of the software-defined network, a configuration system of the network element for managing data to be forwarded so as to enable the network element to operate as a part of the software defined network,
   configuring a first portion of the configuration system to associate, with data received at the network element, a configuring entity-specific identifier identifying a configuring entity related to the received data, the configuring entity-specific identifier constituting at least a part of metadata associated with the received data, and configuring second portions of the configuration system, which are used subsequently to the first portion of the configuration system, to use the metadata comprising the configuring entity-specific identifier when determining actions to be carried out by the network element in conjunction with the received data.

15. The method according to claim 14, wherein the method comprises modifying metadata formats each being defined by one of mutually different configuring entities so that the configuring entity-specific identifier is at a same location in each of the modified metadata formats.

16. The method according to claim 14, wherein the method comprises modifying metadata formats each being defined by one of mutually different configuring entities to contain an additional data field for the configuring entity-specific identifier.

17. The method according to claim 14, wherein the configuring entity-specific identifier identifies an application or a group of applications represented by the received data.

18. The method according to claim 14, wherein the configuring entity-specific identifier identifies one or more of controllers of the controller system, the one or more of the controllers having sent a portion of the configuration data so that an application or a group of applications represented by the received data has been programmed to the configuration system on the basis of the portion of the configuration data.

19. The method according to claim 17, wherein each application is one of the following: Voice over Internet "VoIP", Video on Demand "VoD", Online gaming for providing game services, Cacheing for content delivery and picture caching.

20. The method according to claim 14, wherein the configuring entity-specific identifier is determined for the received data on the basis of at least one of the following:
the OSI model Level 4 transport layer field classification related to the received data,
the OSI model Level 5 session layer field classification related to the received data,
the OSI model Level 6 presentation layer field classification related to the received data,
the OSI model Level 7 application layer "L7" field classification related to the received data.

21. A non-transitory computer readable medium encoded with a computer program for a network element of a software-defined network, the computer program comprising computer executable instructions for controlling a programmable processing system of the network element to:
construct, in accordance with configuration data received from a controller system of the software-defined network, a configuration system for managing data to be forwarded so as to enable the network element to operate as a part of the software defined network,
configure a first portion of the configuration system to associate, with data received at the network element, a configuring entity-specific identifier identifying a configuring entity related to the received data, the configuring entity-specific identifier constituting at least a part of metadata associated with the received data, and
configure second portions of the configuration system, which are used subsequently to the first portion of the configuration system, to use the metadata comprising the configuring entity-specific identifier when determining actions to be carried out by the network element in conjunction with the received data.

22. A non-transitory computer readable medium encoded with a computer program for a controller of a software-defined network, the computer program comprising computer executable instructions for controlling a programmable processing system of the controller to:
compose configuration data for controlling a network element to construct a configuration system for managing data to be forwarded by the network element so as to enable the network element to operate as a part of the software defined network, and
control a data transfer interface of the controller to transmit the configuration data to the network element,
configure a first portion of the configuration system to associate, with data received at the network element, a configuring entity-specific identifier identifying a configuring entity related to the data received at the network element, the configuring entity-specific identifier constituting at least a part of metadata associated with the data received at the network element, and
configure second portions of the configuration system, which are used subsequently to the first portion of the configuration system, to use the metadata comprising the configuring entity-specific identifier when determining actions to be carried out by the network element in conjunction with the data received at the network element.

23. The network element according to claim 5, wherein each application is one of the following: Voice over Internet "VoIP", Video on Demand "VoD", Online gaming for providing game services, Cacheing for content delivery and picture caching.

24. The method according to claim 18, wherein each application is one of the following: Voice over Internet "VoIP", Video on Demand "VoD", Online gaming for providing game services, Cacheing for content delivery and picture caching.

* * * * *